(12) United States Patent
Stauder et al.

(10) Patent No.: US 11,437,872 B2
(45) Date of Patent: Sep. 6, 2022

(54) ELECTRIC MACHINE WITH STATOR SEGMENTS AND WINDING SUPPORTS

(71) Applicant: VITESCO TECHNOLOGIES GMBH, Hannover (DE)

(72) Inventors: Peter Stauder, Mainz (DE); Bernhardt Lueddecke, Nuremberg (DE); Lars Vornweg, Menden (DE); Uwe Schein, Kaufungen (DE); Dominik Just, Kronau (DE)

(73) Assignee: Vitesco Technologies GmbH, Hannover (DE)

( * ) Notice: Subject to any disclaimer, the term of this patent is extended or adjusted under 35 U.S.C. 154(b) by 192 days.

(21) Appl. No.: 16/648,300

(22) PCT Filed: Sep. 13, 2018

(86) PCT No.: PCT/EP2018/074716
§ 371 (c)(1),
(2) Date: Mar. 18, 2020

(87) PCT Pub. No.: WO2019/057597
PCT Pub. Date: Mar. 28, 2019

(65) Prior Publication Data
US 2020/0287427 A1 Sep. 10, 2020

(30) Foreign Application Priority Data

Sep. 20, 2017 (DE) .......................... 102017216633.9

(51) Int. Cl.
*H02K 1/14* (2006.01)
*F02B 39/10* (2006.01)

(52) U.S. Cl.
CPC .............. *H02K 1/148* (2013.01); *F02B 39/10* (2013.01)

(58) Field of Classification Search
CPC ............ H02K 1/148; H02K 1/12; H02K 1/14; H02K 1/141; H02K 1/143; H02K 1/145;
(Continued)

(56) References Cited

U.S. PATENT DOCUMENTS 4,574,713 A * 3/1986 Kohnen .................... F27D 1/12
52/504
5,859,486 A * 1/1999 Nakahara ............... H02K 1/148
310/216.084
(Continued)

FOREIGN PATENT DOCUMENTS

DE 102009047454 A1 6/2011
DE 102013207469 A1 11/2014
(Continued)

OTHER PUBLICATIONS

English Translation of JJP20100226937A.*
English Translation of JPH10271782A.*

*Primary Examiner* — Maged M Almawri
(74) *Attorney, Agent, or Firm* — Laurence A. Greenberg; Werner H. Stemer; Ralph E. Locher

(57) ABSTRACT

An electric machine includes an annular stator and a rotor disposed within the stator. The stator has a plurality of stator segments in the circumferential direction and a stator winding applied to a winding support. Each stator segment has lateral cutouts in the circumferential direction. In each case a winding support having a toroidally applied stator winding is introduced into lateral cutouts, which are adjacent in the circumferential direction, of adjacent stator segments. The radial outer side of the stator winding is partially surrounded by stator segment outer arms of mutually adjacent stator segments in such a way that a radially directed outer gap is formed between the stator segment outer arms of the two mutually adjacent stator segments.

10 Claims, 3 Drawing Sheets

(58) Field of Classification Search
CPC ............ H02K 1/146; H02K 1/16; H02K 1/18;
H02K 1/182; H02K 1/185; H02K 1/187;
H02K 1/06; H02K 15/022; H02K 3/522
USPC ..................... 310/216.009, 216.001, 216.113,
310/216.125–216.129, 216.131–216.137,
310/216.021, 216.022, 216.024–216.029,
310/216.086, 216.099, 126, 49.29
See application file for complete search history.

(56) References Cited

U.S. PATENT DOCUMENTS

| | | | | |
|---|---|---|---|---|
| 7,965,014 | B2* | 6/2011 | Shinagawa | H02K 1/148 |
| | | | | 310/216.113 |
| 2003/0057797 | A1* | 3/2003 | Kaneko | H02K 5/128 |
| | | | | 310/216.064 |
| 2004/0124733 | A1* | 7/2004 | Yamamoto | H02K 15/12 |
| | | | | 29/596 |
| 2010/0066199 | A1* | 3/2010 | Shinagawa | H02K 1/148 |
| | | | | 310/216.113 |
| 2013/0187514 | A1* | 7/2013 | Iwata | H02K 1/16 |
| | | | | 310/216.009 |
| 2014/0167557 | A1* | 6/2014 | Kim | H02K 1/165 |
| | | | | 310/216.099 |
| 2015/0180298 | A1* | 6/2015 | Horst | H02K 21/16 |
| | | | | 310/156.08 |

FOREIGN PATENT DOCUMENTS

| | | |
|---|---|---|
| DE | 102015203010 A1 | 12/2015 |
| JP | H10271782 A | 10/1998 |
| JP | 2001298882 A | 10/2001 |
| JP | 2006296035 A | 10/2006 |
| JP | 2010226937 A | 10/2010 |
| WO | 2011066815 A2 | 6/2011 |

* cited by examiner

ELECTRIC MACHINE WITH STATOR SEGMENTS AND WINDING SUPPORTS

BACKGROUND OF THE INVENTION

Field of the Invention

The invention relates to an electric machine which has an annular stator and a rotor arranged within the stator.

Such an electric machine is used for example in an electric compressor of a turbocharger of an internal combustion engine. A compressor which is provided for the supercharging of the internal combustion engine must be operated at very high rotational speeds owing to the efficiency of the aerodynamics. These lie in a range from approximately 70 000 revolutions per minute to 150 000 revolutions per minute.

It is already known to design the stator winding of an electric machine as a concentrated winding, in the case of which the coils are each wound around a stator tooth. This makes a compact design possible, but generates a stator magnetic field with a high spatial harmonic content. This in turn causes high ohmic losses in the rotor of the electric machine owing to eddy currents.

It is also already known to realize the stator winding of an electric machine as a distributed winding. Such a distributed winding replicates a sine wave more effectively than a concentrated winding. If the stator winding is realized as a distributed winding, the eddy currents are significantly reduced. However, distributed windings are usually produced using the pull-in technique or plugged together from individual conductors using the so-called hairpin technique and subsequently welded. In both of the above cases, a comparatively large amount of space is required for the end windings, since the conductors have to be guided past one another during the winding construction process.

DE 10 2013 207 469 A1 has disclosed an electric machine which has an annular stator and a rotor arranged within the stator. The stator has a stator iron. This in turn has a stator yoke and stator teeth. Furthermore, the stator has a stator winding which runs in toroidal fashion around the stator yoke, wherein the stator yoke has an inner groove provided on the inner circumference of the stator yoke, and an outer groove provided on the outer circumference of the stator yoke, for receiving the stator winding. Furthermore, potting is provided on the stator winding in such a way that the stator winding is thermally connected to the stator iron by the potting.

DE 10 2015 203 010 A1 has disclosed a high-speed synchronous machine and an associated stator. This stator has a plurality of windings of an electrically conductive winding wire around an annular core and at least two phases. The annular core is composed of at least two annular core segments, wherein each phase is wound on at least one annular core segment. Here, each partial winding can be wound around a coil body which is formed in such a way that, upon assembly, an annular core segment can be plugged into the coil body. Alternatively thereto, each partial winding may be formed as a self-supporting baked enamel winding which is formed in such a way that, upon assembly, one of the at least two annular core segments can be introduced into the winding. The annular core segments can be connected to one another via a snap connection.

SUMMARY OF THE INVENTION

The object of the invention is to specify an electric machine which has an annular stator and a rotor arranged within the stator, in the case of which the rotor magnet losses are reduced.

This object is achieved by means of an electric machine having the features specified below. Advantageous embodiments and developments of the invention are specified in the dependent claims.

An electric machine according to the invention has an annular stator and a rotor arranged within the stator, wherein the stator has a plurality of stator segments in the circumferential direction and a stator winding applied to a winding support, wherein each stator segment has lateral cutouts in the circumferential direction, a winding support having a toroidally applied stator winding is introduced into lateral cutouts, which are adjacent in the circumferential direction, of adjacent stator segments, and the radial outer side of the stator winding is partially surrounded by stator segment outer arms of mutually adjacent stator segments in such a way that a radially directed outer gap is formed between the stator segment outer arms of the two mutually adjacent stator segments.

The advantages of the invention consist in particular in that the winding inductance that is coupled to the rotor of the electric machine can be kept small, such that the rotor is exposed to only relatively small harmonic amplitudes of the stator magnetic field in relation to the prior art. These advantages of the invention are made possible in that, by means of the invention, the return conductors of the stator winding running outside the stator are used to provide an additional inductance, the B field of which is independent of the rotor, that is to say follows a path which does not lead along the rotor and also does not lead through the latter. The desired inductance can advantageously be set through suitable selection of the length and the width of the outer gap specified according to the invention, which is provided between the two stator segment outer arms of adjacent stator segments and extends in the radial direction.

Advantageous embodiments and developments of the invention are specified in the dependent claims.

BRIEF DESCRIPTION OF THE SEVERAL VIEWS OF THE DRAWING

Exemplary embodiments of the invention will be discussed in more detail below on the basis of the figures.

DETAILED DESCRIPTION OF THE INVENTION

Figure 1:
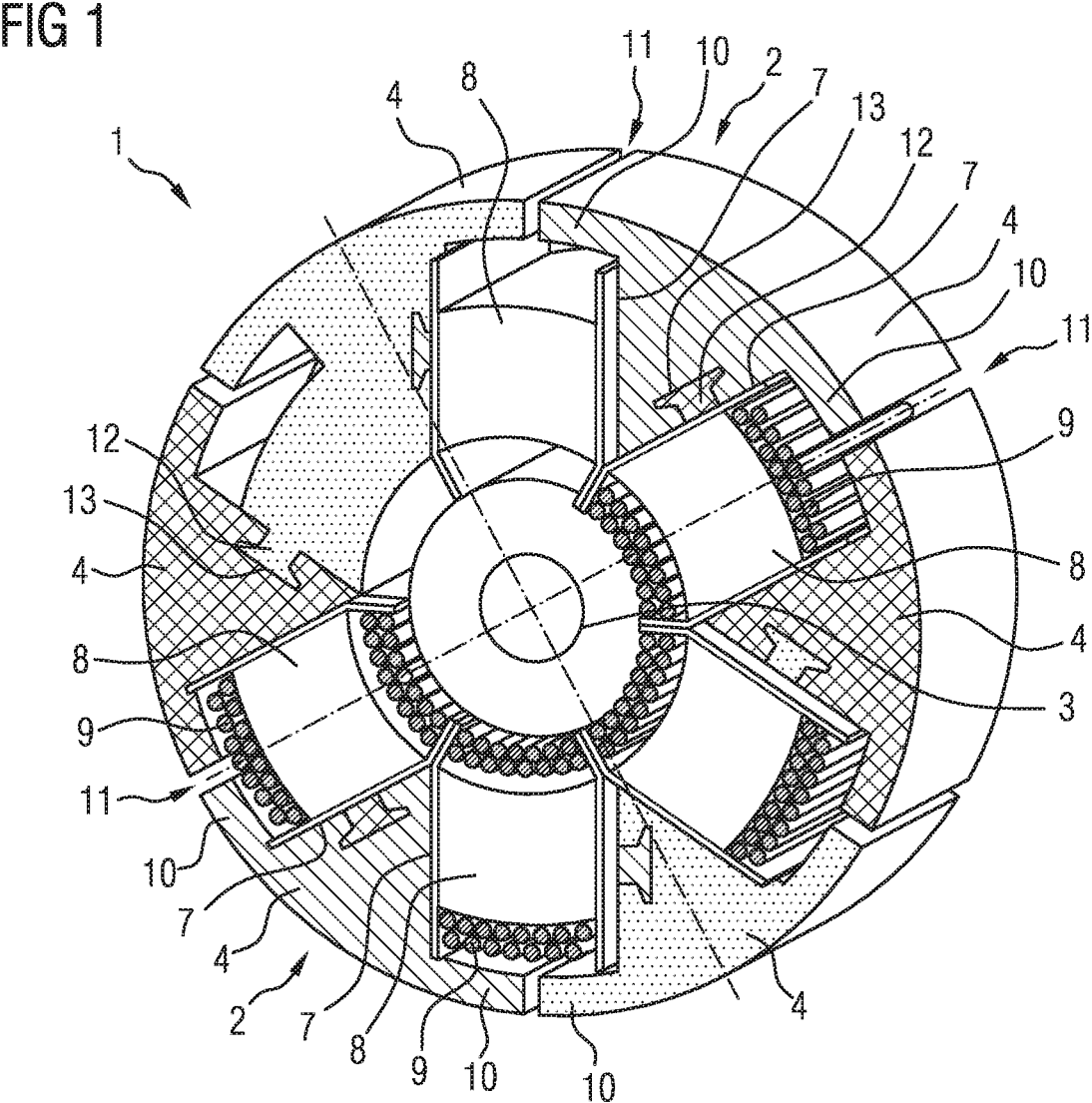
FIG. 1 shows a diagram for illustrating a first exemplary embodiment of an electric machine according to the invention.

FIG. 1 shows a diagram for illustrating a first exemplary embodiment of an electric machine according to the invention.

The electric machine 1 shown in FIG. 1 has an annular stator 2 and a rotor 3 arranged within the stator. The stator 2 has a plurality of stator segments 4 in the circumferential direction and a stator winding 9 applied to a winding support 8. Each of these stator segments 4 is assigned to one of the phases U, V or W of the alternating-current system. Each of these stator segments 4 has lateral cutouts 7 in the circumferential direction. Furthermore, the winding supports 8 are positioned in lateral cutouts 7, which are adjacent in the circumferential direction, of adjacent stator segments 4 and are each provided with a toroidally applied stator winding 9.

The radial outer side of the stator winding 9 is partially surrounded by stator segment outer arms 10 of mutually adjacent stator segments 4 in such a way that a radially directed outer gap 11 is formed between the stator segment outer arms of the two mutually adjacent stator segments.

The length and the width of this outer gap 11 are selected such that an additional magnetic circuit is formed in the region outside the stator, which additional magnetic circuit has a predefined inductance determined by the length and the width of the outer gap 11. Consequently, a magnetic field of desired size can be built up outside the stator through suitable selection of the length and the width of the outer gap 11. This magnetic field formed outside the stator has no influence on the rotor 3, arranged inside the stator 2, of the electric machine, so that the B field or the associated harmonic amplitudes of the additional magnetic field have no undesired effects on the rotor.

The stator segment outer arms 10 each have the same length in the circumferential direction of the stator segments.

In this exemplary embodiment, the winding supports 8 and the respective stator segment 4 are different components. This makes it possible, prior to the assembly of the stator, to wind the stator winding externally onto the respective winding support and then to push the winding support wound with the stator winding onto the respective stator segment.

The electric machine shown in FIG. 1 is a two-pole machine in which the stator winding is applied to a winding support by means of a coil winding method and in which the wound coil support is then pushed onto one of the total of six stator segments 4. In the subsequently occurring final manufacturing step, the individual stator segments are pushed axially into one another.

As has already been stated above, the radial outer side of the stator winding is not fully enclosed by stator material, but in each case an outer gap 11 extending in the radial direction is provided between mutually adjacent stator segments. The desired external inductance can be set by suitable selection of the length and the width of this outer gap 11.

Mutually adjacent stator segments 4 are advantageously fastened to one another using fastening means. In the exemplary embodiment shown, these fastening means are a latching projection 12 which is inserted into a latching recess 13 of the adjacent stator segment.

The latching projection 12 is advantageously led through the winding support 8 wound with the stator winding 9.

An advantage of an electric machine embodied as described above consists in the fact that, on account of the additional magnetic circuit formed outside the stator, the stator magnetic field formed within the stator and coupled to the rotor of the electric machine can be kept small, so that the influence on the rotor of the harmonic amplitudes of the magnetic field formed within the stator is kept small.

Figure 2:
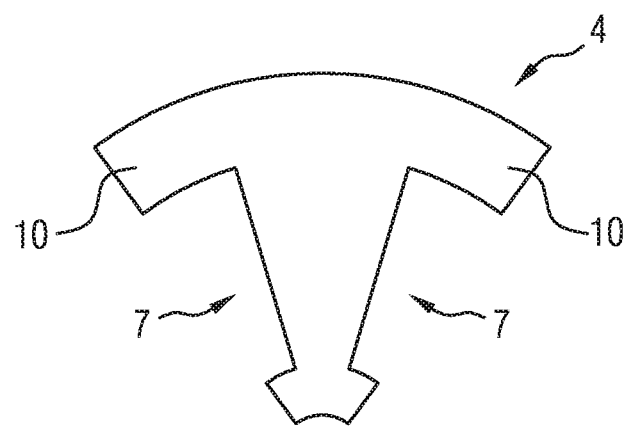
FIG. 2 shows a simplified diagram for illustrating the basic structure of a stator segment of the electric machine shown in FIG. 1.

FIG. 2 shows a simplified diagram for illustrating the basic structure of a stator segment 4 of the electric machine shown in FIG. 1. It is particularly evident from FIG. 2 that a stator segment 4 has lateral cutouts 7 in the circumferential direction into which, as has been described above, the winding support 8 wound with the stator winding 9 can be inserted.

Furthermore, it is evident that each stator segment has stator segment outer arms 10 in its radially outer region, with the result that a radially directed gap can be formed between mutually adjacent stator segment outer arms of mutually adjacent stator segments. As can be seen from FIG. 1, this gap is positioned centrally above the radial outer side of the stator winding 9.

Figure 3:
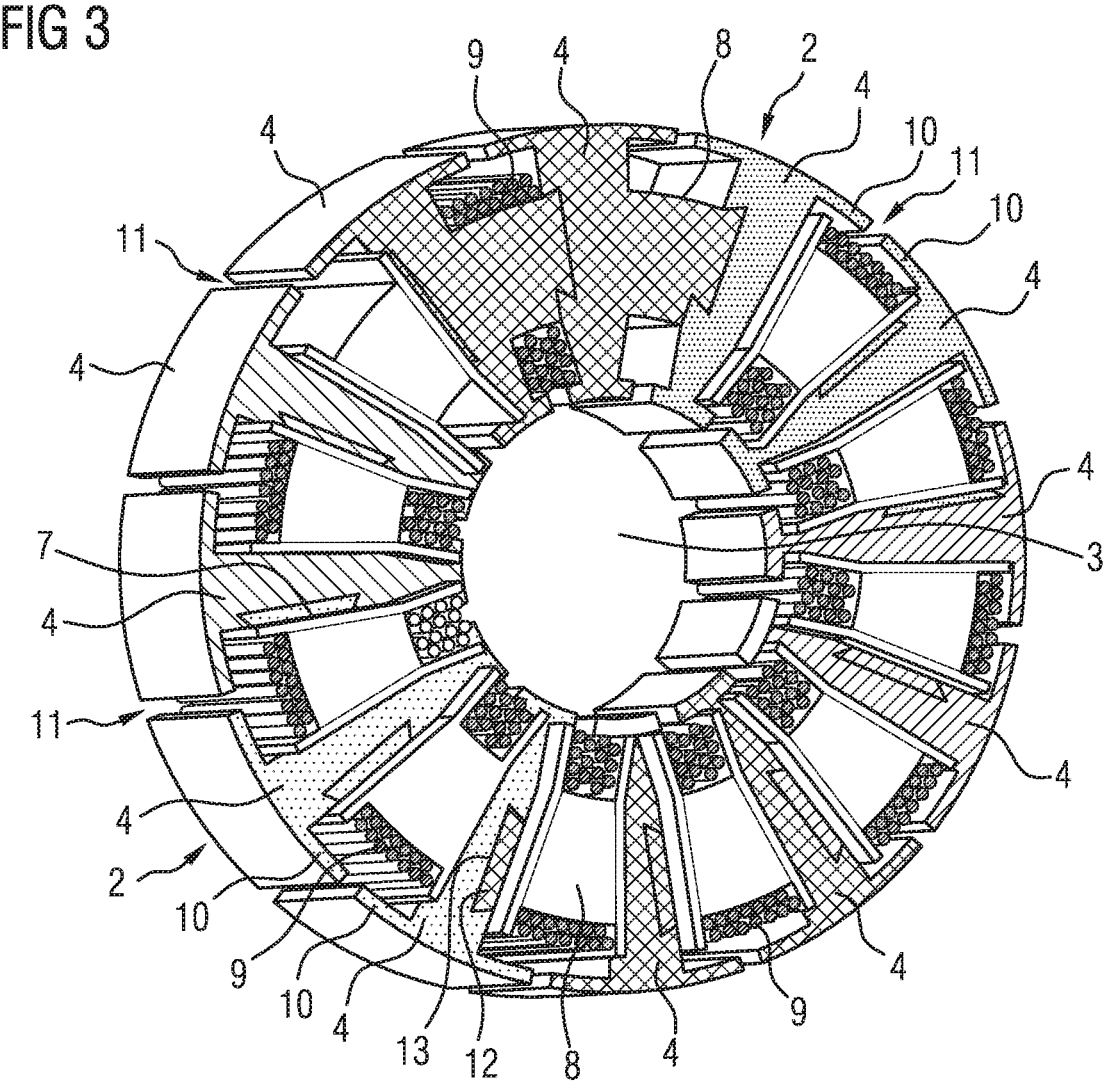
FIG. 3 shows a diagram for illustrating a second exemplary embodiment of an electric machine according to the invention.

FIG. 3 shows a diagram for illustrating a second exemplary embodiment of an electric machine according to the invention. What is concerned in this second exemplary embodiment is a two-pole, twelve-groove stator.

The electric machine 1 shown in FIG. 3 also has an annular stator 2 and a rotor 3 arranged within the stator. The stator 2 has a plurality of stator segments 4 in the circumferential direction and a stator winding 9 applied to a winding support 8. Each of these stator segments 4 is assigned to one of the phases U, V or W of the alternating-current system. Each of these stator segments 4 has lateral cutouts 7 in the circumferential direction. The winding supports 8 are positioned in lateral cutouts 7, which are adjacent in the circumferential direction, of adjacent stator segments 4 and are each provided with a toroidally applied stator winding 9.

The radial outer side of the stator winding 9 is partially surrounded by stator segment outer arms 10 of mutually adjacent stator segments 4 in such a way that a radially directed outer gap 11 is formed between the stator segment outer arms of the two mutually adjacent stator segments.

The length and the width of this outer gap 11 are selected such that an additional magnetic circuit is formed in the region outside the stator, which additional magnetic circuit has a predefined inductance determined by the length and the width of the outer gap 11. Consequently, a magnetic field of desired size can be built up outside the stator through suitable selection of the length and the width of the outer gap 11. This magnetic field formed outside the stator has no influence on the rotor 3, arranged inside the stator 2, of the electric machine, so that the B field or the associated harmonic amplitudes of the additional magnetic field have no undesired effects on the rotor.

The stator segment outer arms 10 each have the same length in the circumferential direction of the stator segments.

In this second exemplary embodiment, the winding supports 8 are injection-molded onto the respective stator segment 4 and consequently form, together with the respective stator segment, a one-piece component. This makes it possible, prior to the assembly of the stator, to prewind the stator winding externally by means of a suitable winding method and then to push it onto the respective winding support which, together with the respective stator segment 4, forms a one-piece component.

Figure 4:
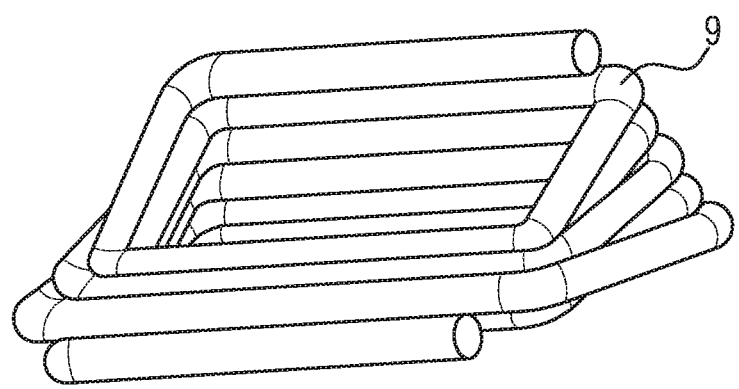
FIG. 4 shows a diagram for illustrating a prewound coil.

FIG. 4 shows an exemplary embodiment of an externally prewound stator winding. As can be seen from FIG. 4, this stator winding is not configured to be symmetrical on its inner side and its outer side, in order to free up sufficient space for the magnetic flux in the stator material. On its inner side, the stator winding is wound narrow and high and, on its outer side, wide and flat. This construction of a stator winding is also visible from FIG. 3, since a winding groove which is designed to be narrow and high is provided there in the radially inner region of the respective stator segment, whereas a winding window which is designed to be wide and flat is provided in the radially outer region of the respective stator segment.

As has already been stated above, the radial outer side of the stator winding is not fully enclosed by stator material, but in each case an outer gap 11 extending in the radial direction is provided between the mutually adjacent stator segments. The desired external inductance can be set by suitable selection of the length and the width of this outer gap 11.

Mutually adjacent stator segments 4 are advantageously fastened to one another using fastening means. These fastening means are preferably a latching projection 12 which is inserted into a latching recess 13 of the adjacent stator segment.

The latching projection 12 is advantageously led through the winding support 8 injection-molded onto the stator segment 4.

An advantage of an electric machine embodied as described above consists in the fact that, on account of the additional magnetic circuit formed outside the stator, the stator magnetic field formed within the stator and coupled to the rotor of the electric machine can be kept small, so that the influence on the rotor of the harmonic amplitudes of the magnetic field formed within the stator is kept small.

Figure 5:
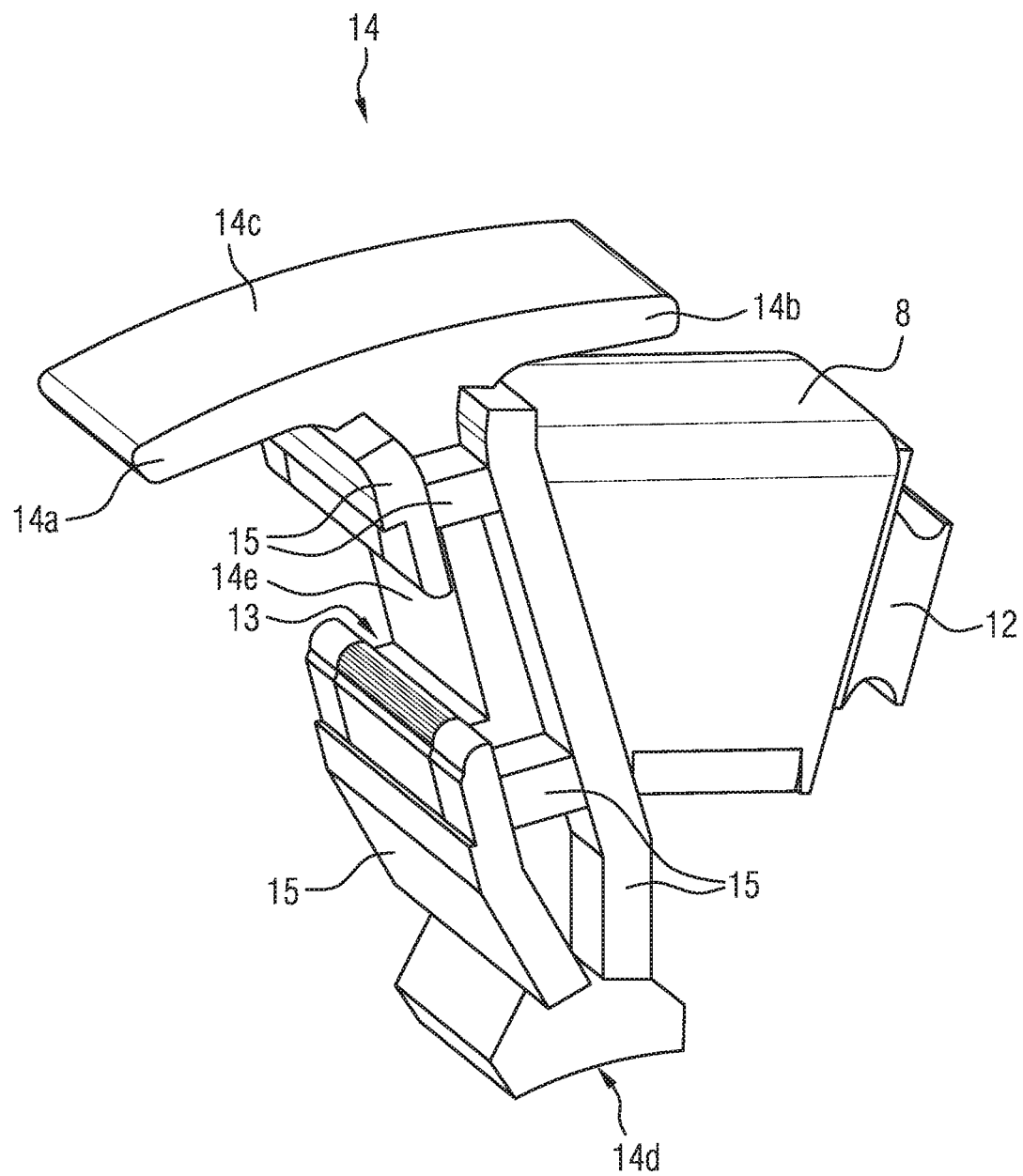
FIG. 5 shows a diagram for illustrating the basic structure of a stator segment of the electric machine shown in FIG. 3.

FIG. 5 shows a diagram for illustrating the basic structure of a stator segment of the electric machine shown in FIG. 3. This stator segment has a stator tooth 14 which has a first stator tooth outer arm 14a, a second stator tooth outer arm 14b, a stator tooth outer surface 14c, a stator tooth inner surface 14d and a stator tooth body 14e. An insulating body 15 is fastened to the stator tooth body 14e and electrically insulates the different electrically conducting components of the stator segment from one another. A latching projection 12 is formed monolithically in one piece with the stator tooth body 14e and is led through a winding support 8 injection-molded onto the stator tooth body. On the side of the stator tooth that is situated opposite the latching projection 12 there is provided a latching recess 13 which, upon assembly of the stator segments, is designed to receive the latching projection of an adjacently arranged stator segment.

An advantageous embodiment of the invention consists in equipping the electric machine with an additional winding, which serves as a sensor winding, in the region of the inner circumference of the stator segments. This additional winding is preferably a distributed winding composed of a very thin wire.

The stator winding can be realized in the form of a triangular circuit or a star circuit.

The electric machine is generally a multipole machine.

As an alternative to using latching projections and latching recesses, it is also possible for adjacent stator segments to be connected to one another in another way; for example, the segments of the stator can be welded to one another, connected to one another by means of plastic injection-molding or connected to one another by means of any other "puzzle geometry".

The complete stator may advantageously be enclosed by a potting composed of a thermally conductive material for the purposes of better heat dissipation.

Furthermore, in each case one insulation layer may be introduced between adjacent stator segments in order to avoid any occurrence of short circuits between adjacent stator segments and any occurrence of eddy currents.

The invention claimed is:

1. An electric machine, comprising:
   an annular stator and a rotor disposed within said stator;
   said stator having a plurality of stator segments disposed in a circumferential direction, each stator segment including a winding support and a stator winding toroidally applied to said winding support;
   each of said stator segments having lateral cutouts disposed in the circumferential direction and stator segment outer arms;
   each of said winding supports with said applied stator winding being introduced into circumferentially adjacent said lateral cutouts of adjacent stator segments;
   said stator winding having a radial outer side being partially surrounded by said stator segment outer arms of mutually adjacent stator segments forming a radially directed outer gap between said stator segment outer arms of each two respective mutually adjacent stator segments; and
   said outer gap having a length and a width selected to form an additional magnetic circuit of predefined inductance in a region outside said stator, said predefined inductance determined by the length and the width of said outer gap, said additional magnetic circuit producing a magnetic field of a desired size outside the stator that has no influence on the rotor.

2. The electric machine according to claim 1, wherein said stator segment outer arms have identical lengths in the circumferential direction of said stator.

3. The electric machine according to claim 1, wherein each of said winding supports is injection-molded onto a respective stator segment.

4. The electric machine according to claim 1, wherein said stator winding is not symmetrical on its inner side and its outer side.

5. The electric machine according to claim 4, wherein said stator winding is wound narrow and high on its inner side and wide and flat on its outer side.

6. The electric machine according to claim 1, wherein said winding support and said stator segment are different components, and each of said winding supports with said applied stator winding is pushed onto a respective stator segment.

7. The electric machine according to claim 6, wherein each of said stator segments has a fastener oriented in a direction of an adjacent stator segment.

8. The electric machine according to claim 7, wherein said fastener of each of said stator segments includes a latching projection in the direction of said adjacent stator segment.

9. The electric machine according to claim 8, wherein said fastener of each of said stator segments includes a latching recess facing away from said winding support on an outer side of said stator segment.

10. The electric machine according to claim 8, wherein said latching projection passes through said winding support.

* * * * *